United States Patent [19]
Häfner

[11] Patent Number: 5,255,830
[45] Date of Patent: Oct. 26, 1993

[54] GRAVIMETRIC METERING APPARATUS FOR POURABLE MATERIAL AND CONVEYING SYSTEM USING IT

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 745,673

[22] Filed: Aug. 16, 1991

[30] Foreign Application Priority Data

Aug. 17, 1990 [DE] Fed. Rep. of Germany ....... 4026042

[51] Int. Cl.$^5$ .................... G01G 13/10; B65G 53/04; B65G 53/38
[52] U.S. Cl. .................... 222/370; 222/67; 222/77; 222/195; 406/62
[58] Field of Search .............. 222/370, 636, 195, 67, 222/77; 406/62, 66, 134, 67

[56] References Cited

U.S. PATENT DOCUMENTS

| | | | |
|---|---|---|---|
| 3,203,738 | 8/1965 | Forsyth et al. | 406/66 X |
| 4,092,046 | 5/1978 | Bombelli et al. | 222/370 X |
| 4,336,851 | 6/1982 | Iwako | 222/77 X |
| 4,528,848 | 7/1985 | Häfner | 222/77 X |
| 4,646,943 | 3/1987 | Häfner | 222/370 X |
| 4,661,024 | 4/1987 | Häfner | 406/66 X |
| 4,681,484 | 7/1987 | Egger | 222/370 X |
| 4,792,059 | 12/1988 | Kerner et al. | 222/67 |
| 4,863,076 | 9/1989 | Anderson et al. | 222/636 |
| 4,881,661 | 11/1989 | Jones | 222/67 |
| 4,958,747 | 9/1990 | Sheets | 222/67 |

FOREIGN PATENT DOCUMENTS

| | | | |
|---|---|---|---|
| 14752 | 11/1956 | Fed. Rep. of Germany | 406/62 |
| 1348167 | 11/1963 | France | 222/77 |

Primary Examiner—Andres Kashnikow
Assistant Examiner—Anthoula Pomrening
Attorney, Agent, or Firm—Armstrong, Westerman, Hattori, McLeland & Naughton

[57] ABSTRACT

A continuous gravimetric metering apparatus for pourable material including a predetermined measuring path supplied with pourable material, the predetermined measuring path being provided with a porous wall for continuously supplying a finely distributed air stream thereto. The apparatus is particularly adapted for use in a continuously operating conveying system for pourable material having lower flowability in large quantities.

18 Claims, 4 Drawing Sheets

GRAVIMETRIC METERING APPARATUS FOR POURABLE MATERIAL AND CONVEYING SYSTEM USING IT

FIELD OF THE INVENTION

The invention relates to a gravimetric metering apparatus for pourable materials and a system for conveying such materials in large quantities as well as a method for operating such a system.

BACKGROUND ART

U.S. Pat. No. 4,528,848 discloses an apparatus for continuous gravimetric metering of pourable material conveyed through a charging inlet into pockets of a rotor arranged in a housing rotatable about an essentially vertical axis and fed out from the pockets through a discharging outlet arranged offset in respect of the charging inlet in rotational direction of the rotor. The housing is mounted in a frame pivotally about an essentially horizontal axis and depends on the frame via a load cell arranged remote from said axis. Pressurized air is supplied through an opening provided opposite the discharging outlet. Elastic connecting elements as compensators flexibly couple said housing to corresponding ducts for charging and discharging the material and for supplying pressurized air.

Such a gravimetric metering apparatus operates with high satisfaction even on a long term basis. However, due to the pneumatic conveying it must have a very stable and rigid design which is of particular disadvantage when conveying high quantities of pourable material. Furthermore, there are some problems when conveying pourable material which tend to stick together such as powdered cement.

Typically, with a known system such powdered cement is supplied to a heat exchanger from a bin in metered large quantities as 100 to 300 tons per hour. For such purpose the material is guided through a conveyor trough onto a belt-type metering device. The conveyor trough is arranged in an inclined position and is provided with a porous bottom permitting air being finely distributed from a pressurized air space into the material conveyed on the conveyor trough. However, such a system operates as an open system which requires considerable measures as covers and enclosures in order to comply with environmental regulations.

German Laid Open Patent Publication 1,010,014 relates to a device for pneumatically emptying a container from powdered material. There is provided a type of syphon having a porous bottom through which air is blown from a pressurized air space into the syphon for causing the material to be mixed with the air to form a dust-air mixture.

The German Laid Open Patent Publication 3,901,772 relates to a weighing apparatus having a weighing container eccentrically depending from a load cell. Since the outlet portion is curvedly formed, no closing element is necessary but the material is selfblocking and is suctioned out when desired.

The German Patent Specification 2,234,134 relates to a pneumatic conveying system using a level determining element for controlling the level in a container.

The German published Patent Application 2,021,493 relates to a conveyor trough for pneumatic conveying of pourable material. Between an upper box and a lower box there is arranged an air permeable wall.

SUMMARY OF THE INVENTION

It is an object of the invention to provide a gravimetric metering apparatus adapted for processing large quantities of less flowable pourable material in a closed system.

It is a further object of the present invention to provide a conveying system of relatively simple design and high accuracy and adapted to convey large quantities of pourable material.

It is a still further object of the invention to provide a method for gravimetric metering and conveying of large quantities of less flowable pourable material.

According to one aspect of the invention a gravimetric metering apparatus comprises a predetermined measuring path including a rotor rotatably mounted in a housing between a top wall and a bottom wall thereof arranged in parallel to each other and being provided with peripherally distributed pockets, said top wall of said housing having a charging inlet for supplying pourable material to said pockets and said bottom wall having a discharging outlet offset in respect of said charging inlet in the direction of rotation of said rotor, said predetermined measuring path being represented by said angular distance between said charging inlet and said discharging outlet; and a pressurized gas space contiguous to said bottom wall, said bottom wall being porous at least in a region covered by said pockets.

According to a further aspect of the invention a conveying system comprises a continuous gravimetric metering apparatus including a rotor rotatably mounted in a housing between a top wall and a bottom wall thereof arranged in parallel to each other and being provided with peripherally distributed pockets, said top wall of said housing having a charging inlet for supplying pourable material to said pockets and said bottom wall having a discharging outlet offset in respect of said charging inlet in the direction of rotation of said rotor, said predetermined measuring path being represented by said angular distance between said charging inlet and said discharging outlet; a pressurized gas space contiguous to said bottom wall, said bottom wall being porous at least in a region covered by said pockets; and container means arranged above said charging inlet for supplying pourable material to said pockets of said rotor, said container means having a porous bottom wall below which there is arranged a further pressurized gas space.

The method of the invention comprises providing a predetermined measuring path including a rotor rotatably mounted in a housing between a top wall and a bottom wall thereof arranged in parallel to each other and being provided with peripherally distributed pockets, said top wall of said housing having a charging inlet for supplying pourable material to said pockets and said bottom wall having a discharging outlet offset in respect of said charging inlet in the direction of rotation of said rotor, said predetermined measuring path being represented by said angular distance between said charging inlet and said discharging outlet; a pressurized gas space contiguous to said bottom wall, said bottom wall being porous at least in a region covered by said pockets; and supplying said predetermined measuring path from below with a finely distributed continuous gas stream.

Further improvements of the apparatus and the system of the invention are characterized in the dependent claims.

Further features and advantages of the invention will be apparent from the following description of a preferred embodiment by reference to the drawings.

BEST MODE OF CARRYING OUT THE INVENTION

Figure 1:
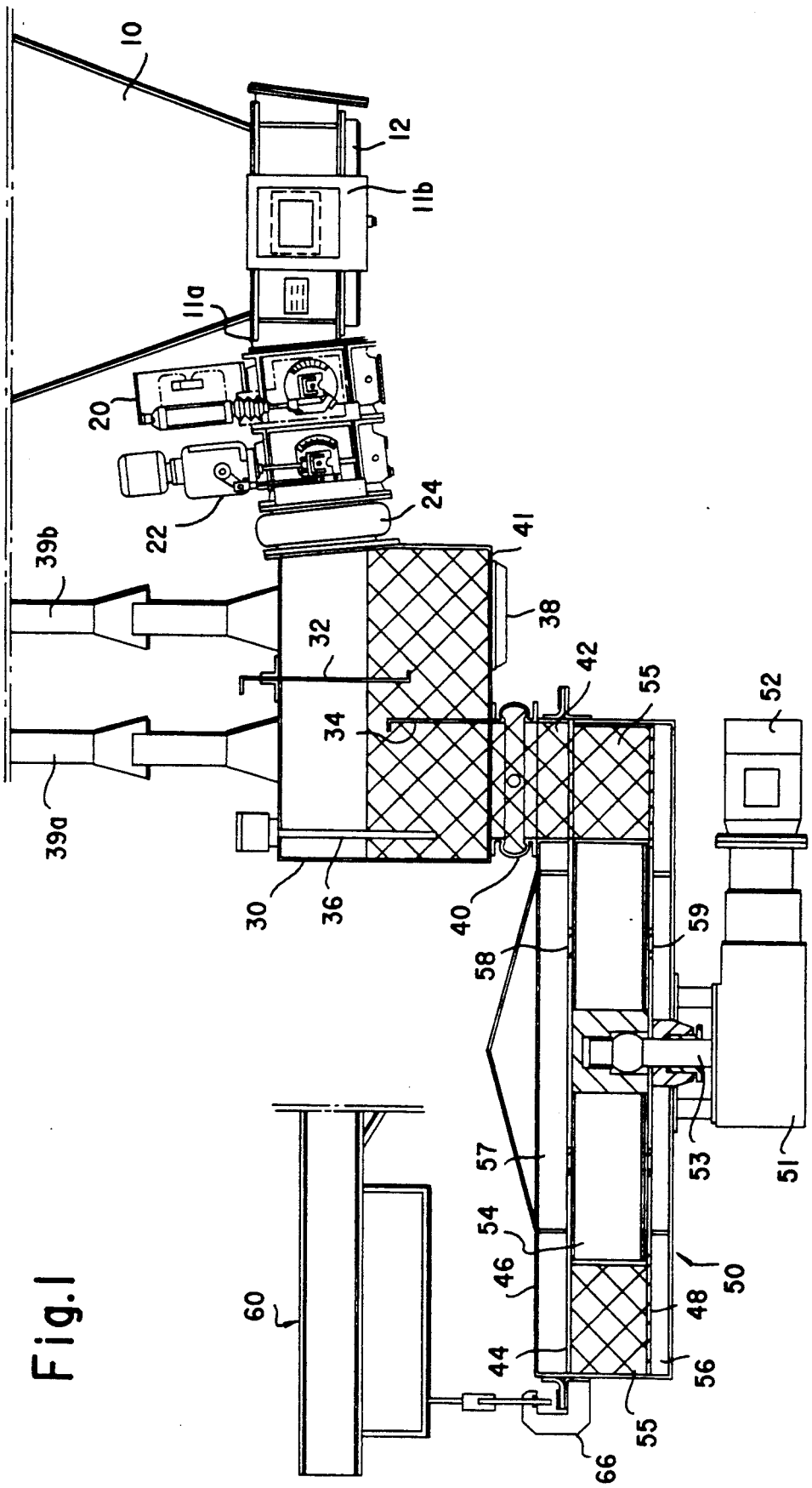
FIG. 1 is a schematic elevational view partially in section of a system for conveying pourable material using a gravimetric metering apparatus according to the invention.

FIG. 1 illustrates the principal design of a preferred embodiment of a system for conveying and metering large quantities of pourable material. For example, such a system may be used for conveying and metering of powder-type cement to a heat exchanger (not shown).

Specifically, a bin 10 is provided with a plurality of outlets 11a, 11b having connected thereto appropriate closing and metering devices 20, 22 which are coupled downstream with an abating container 30 by means of a flexible first compensator 24. A downward outlet of the container 30 is coupled by a flexible second compensator 40 with a charging inlet 42 of a gravimetric metering apparatus 50. At a position peripherally offset in respect of the charging inlet 42 apparatus 50 is provided with a downward discharging outlet 69 (FIG. 4) connected to an output duct 67 (FIG. 3) by means of a flexible third compensator 68.

The principal design of the gravimetric metering apparatus 50 is disclosed in U.S. Pat. No. 4,528,848, the full disclosure of which is made contents of this specification by a reference. However, according to the invention, the known apparatus has been modified in respect of certain aspects.

In short, a rotor 44 continuously rotates in an essentially closed housing 46 driven by a motor 52, a gearing 51 and a shaft 53. Rotor 44 has an essentially closed inner space 54 peripherally surrounded by pockets 55 which, in modification of the known apparatus, are preferably peripherally open. It is of importance for the invention that a pressurized air space 56 is arranged below rotor 44 at least below its pockets 55 which pressurized air space 56 is separated from rotor 44 by a porous wall 48 typically in the form of a metal web. Pressurized space 56 is permanently supplied with pressurized air (or another gas) such that air is blown, finely distributed through web 48 into pockets 55 causing a fluidization of the pourable material in these pockets. This results in a considerable improvement of the flowability of the pourable material and considerably reduces the tendency of caking together of material particles. As disclosed in the above mentioned U.S. patent pourable material is only present in pockets 55 of rotor 44 in the region between the charging inlet 42 and the discharging outlet 69. Thus, porous wall 48, and, if desired, pressurized air space 56 may be restricted to this region. Alternatively, porous wall 48 and pressurized air space 56 may be extended to the overall circular path of pockets 55 with the air blown into the empty pockets 55 as well as agitating any material adhering to the walls thereof.

Furthermore, in order to prevent accumulation of pourable material in the inner space 54 of rotor 44, preferably nozzles 59 are provided blowing air from pressurized air space 56 into inner space 54. Additionally, a further pressurized air space 57 may be provided on the top side of rotor 44 blowing air through nozzles 58 into inner space 54. This causes an increased pressure in inner space 54 preventing material from penetrating out of pockets 55 into inner space 54.

Figure 2:
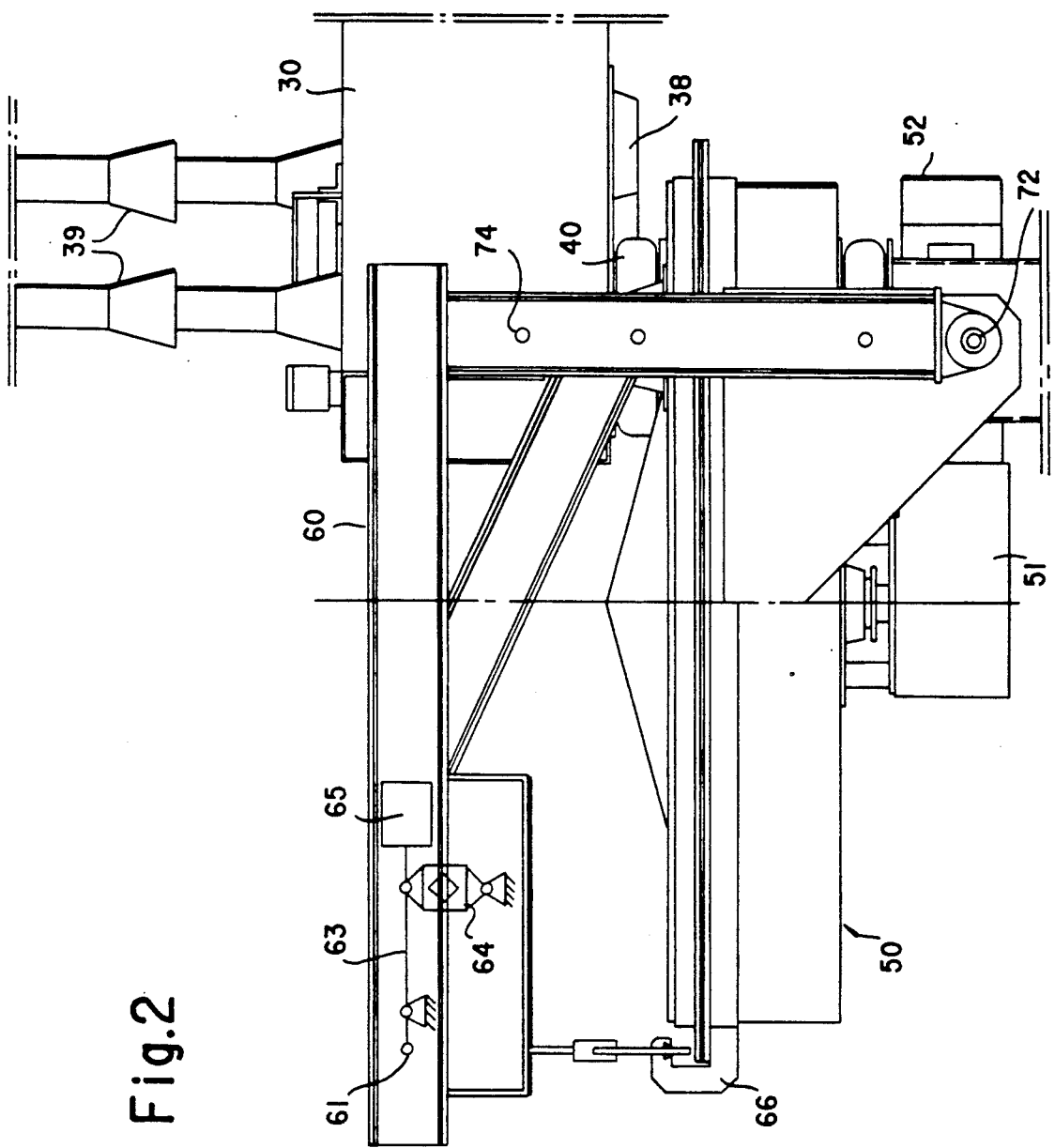
FIG. 2 is an elevational view illustrating the apparatus shown in FIG. 1 in more detail.

As explained in the above mentioned U.S. Patent, gravimetric metering is accomplished by apparatus 50 in that housing 46 is mounted at a frame 60 pivotally in bearings 72, 74 about an axis 70. Furthermore, housing 46 is dependent by means of a hook 66 (FIGS. 1 and 2) at a point 61 remote from axis 70 with a load cell 64 arranged therebetween. A calibration mass 65 may be adjustibly supported by lever 63 connected to point 61 on the one side and to load cell 64 on the other side (FIG. 2). Thus, the mass of apparatus 50 with rotor 44 empty may be compensated.

As explained in the above mentioned U.S. patent, axis 70 preferably extends through second compensator 40 provided at the charging inlet 42 and at least one further compensator as third compensator 68 arranged with the apparatus of the above mentioned U.S. patent on top of housing 46 such that the material must be blown out of pockets 55 in upward direction with the axis 70 extending essentially horizontal.

According to a general feature of the present invention axis 70 now extends inclined in respect to the horizontal direction such that it extends through the centers of compensators 40 and 68 with compensator 68 being arranged on the bottom side of housing 46. Depending on the diameter of rotor 44 the angle between axis 70 and the horizontal direction may be in a range between 10 to 45 degrees, preferably in a range between 25 and 35 degrees. It should be noted that the connection between hook 66 and hinge point 61 may still extend in a vertical direction with the force component measured in this direction being correspondingly used for calculating the overall force. Alternatively, appropriate calibration may be applied.

Figure 3:
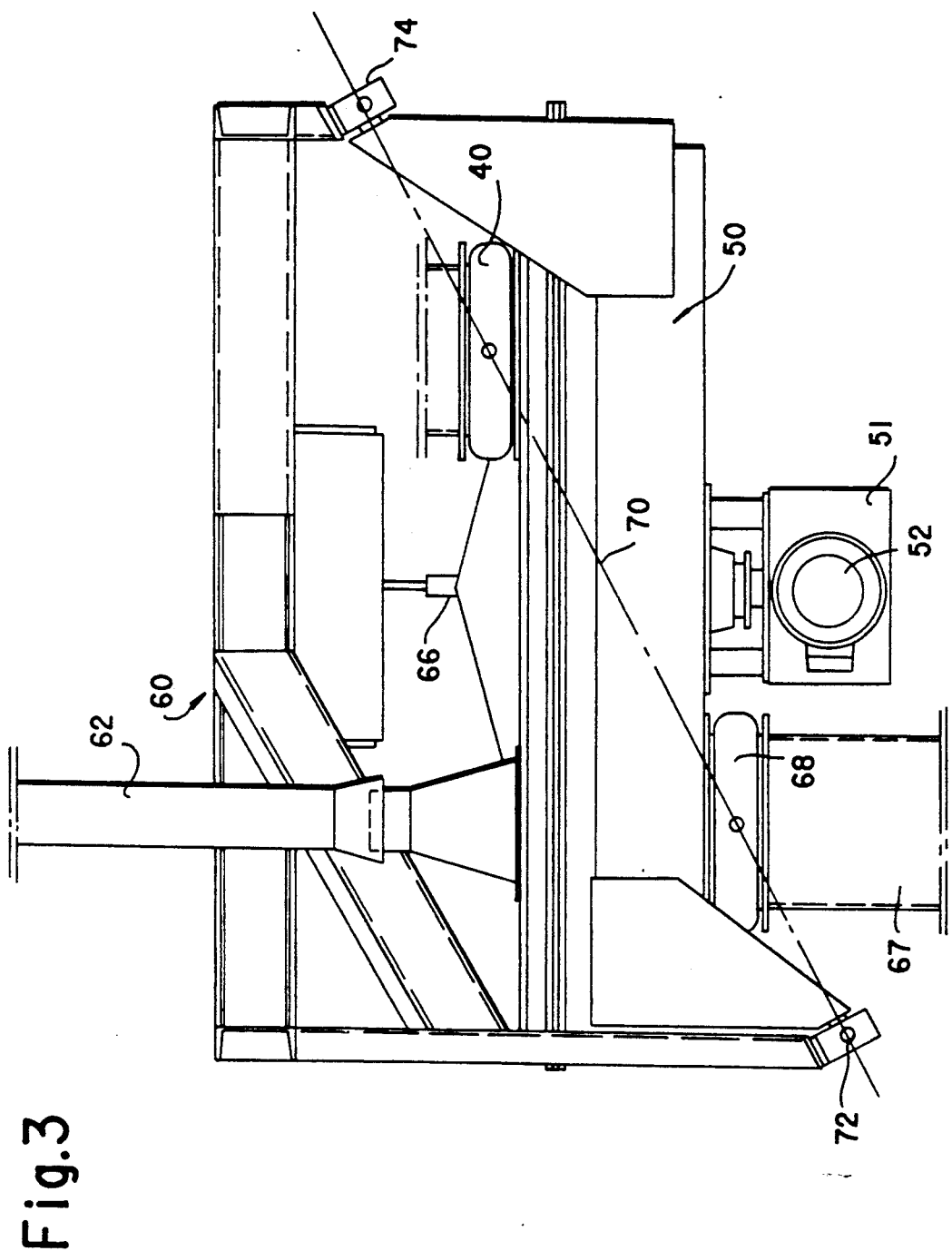
FIG. 3 is a schematic elevational view of the apparatus shown in FIG. 1 offset by 90°.
Figure 4:
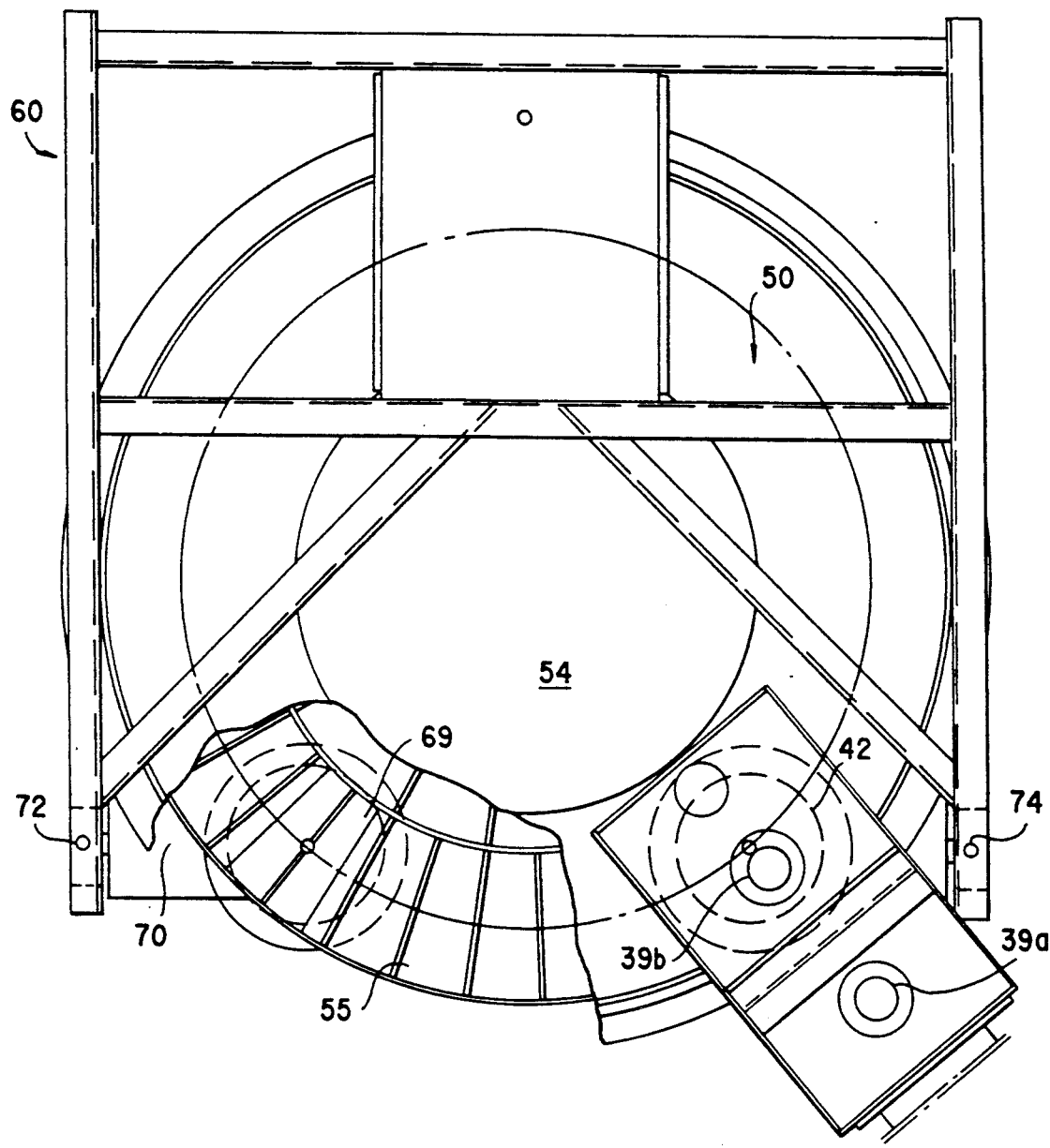
FIG. 4 is a schematic plan view of the apparatus of FIG. 2.

As may be gathered from FIGS. 3 and 4 a suction tube 62 may be attached to the top side of housing 46 in opposition to discharging outlet 69 for removing the increased pressure in the pockets 55 enhancing filling of the emptied pockets 55.

From the above description it will be appreciated that the invention provides a novel gravimetric metering apparatus adapted even for material having lower flowability and which has an increased accuracy and does not need a pressure stability due to the specific inclined extension of pivotal axis 70 since the pourable material is not removed pneumatically from pockets 55. Such a gravimetric metering apparatus is of general use; however, according to the preferred embodiment it is used in connection with a conveying system for conveying material in large quantities. In this connection the specific design of a abating container 30 is of importance being provided above housing 46 of apparatus 50 with a bottom pressurized air space 38 arranged below a porous bottom 41 again permitting blowing finely distributed air into abating container 30 considerably improving flowability of the pourable material. As a specific feature for calming down or abating material in container 30 received from bin 10 a syphon comprising vertical walls 32, 34 offset to each other is provided such that material whirled up in the right hand portion of abating container 30 (FIG. 1) passes to the left hand portion in a calmed down manner. Then, by gravity it passes through compensator 40 to charging inlet 42 of apparatus 50. A level indicator 36, for example, in the form of a floating element may be used for continuously determining the level of pourable material in abating container 30 with the determined value being used for controlling metering device 22 in order to maintain a desired level. A coarse adjustment of metering device 22 may be accomplished in dependence on a selected desired rotational speed of rotor 44 or its motor 52, respectively.

As illustrated in FIG. 1 between bin 10 and metering device 22, preferably designed as a metering drum or cylinder valve a manually actuated blocking valve 20 may be provided. Furthermore, bottom side of bin 10 may preferably have attached thereto a pressurized air space 12 connected to bin 10 through a porous bottom wall. Thus, flowability of the pourable material is even improved at this initial position. In this connection it should be noted that by appropriate design of the lower portion of container 10 in a manner as the design of abating container 30 the latter may be omitted and the pourable material may be directly charged to apparatus 50 from bin 10.

Similarly to suction duct 62 (FIG. 3) provided in opposition to discharging outlet 69, right and left suction ducts 39a, 39b may be provided at the top side of abating container 30 avoiding any essential increased pressure therein.

Though with the preferred embodiment of the system according to the invention a specifically preferred design of the gravimetric metering apparatus 50 similar to that of the above mentioned U.S. patent has been explained similar metering apparatus may be applied as well as those of U.S. Pat. No. 4,336,851 or German Laid Open Publication 23 12 129 with the inventive feature of providing a pressurized air space connected to the conveying path of the metering apparatus by a porous wall.

I claim:

1. A continuous gravimetric metering apparatus for pourable material comprising:
   a housing;
   a predetermined measuring path including a rotor rotatably mounted in the housing immediately adjacent and between a top wall and a bottom wall thereof arranged in a parallel to each other so as to define peripherally distributed pockets, said top wall of said housing having a charging inlet for supplying pourable material to said pockets and said bottom wall having a discharging outlet offset in respect of said charging inlet in the direction of rotation of said rotor, said predetermined measuring path being represented by an angular distance between said charging inlet and said discharging outlet; and
   a pressurized gas space contiguous to said bottom wall, said bottom wall being porous at least in a region covered by said pockets for fluidizing the pourable material within said pockets.

2. The apparatus of claim 1, wherein said rotor has an inner region surrounded by said pockets and said bottom wall is provided with nozzles pressing gas from said pressurized gas space to said inner region.

3. The apparatus of claim 2, further comprising an upper pressurized gas space contiguous to said inner region of said rotor with the top wall of said housing being provided with further nozzles for passing pressurized gas from said upper pressurized gas space to said inner region of said rotor.

4. The apparatus of claim 1, wherein said housing is mounted on a frame pivotal about an axis and is depended from said frame via a load cell remote from said axis.

5. The apparatus of claim 4, further comprising flexible connecting elements arranged at said charging inlet and said discharging outlet, respectively, with said axis extending through centers of said flexible connecting elements.

6. The apparatus of claim 1 further comprising a suction means connected to said top wall at a position essentially after said discharging outlet in the rotation direction of said rotor for removing gas from said pockets.

7. A system for metered conveying of pourable material in large quantities comprising:
   a housing;
   a continuous gravimetric metering apparatus including a rotor rotatably mounted in the housing between a top wall and a bottom wall thereof arranged in parallel to each other and being provided with peripherally distributed pockets, said top wall of said housing having a charging inlet for supplying pourable material to said pockets and said bottom wall having a discharging outlet offset in respect of said charging inlet in the direction of rotation of said rotor said predetermined measuring path being represented by an angular distance between said charging inlet and said discharging outlet;
   a pressurized gas space contiguous to said bottom wall, said bottom wall being porous at least in a region covered by said pockets; and
   container means arranged above said charging inlet for supplying pourable material to said pockets of said rotor, said container means having a porous bottom wall below which there is arranged a further pressurized gas space.

8. The system of claim 7, further comprising a syphon means arranged in said container means between a first region of said container means arranged above said further pressurized gas space and a second region arranged above said charging inlet of said housing for calming down pourable material fluidized by said pressurized gas.

9. The system of claim 7, further comprising a level determining means arranged in said container means and providing a signal representing a level of said pourable material contained in said container means and used for controlling supply of pourable material to said container means.

10. The system of claim 7, wherein said rotor has an inner region surrounded by said pockets and said bottom wall is provided with nozzles pressing gas from said pressurized gas space to said inner region.

11. The system of claim 10, further comprising an upper pressurized gas space contiguous to said inner region of said rotor with the top wall of said housing being provided with further nozzles for passing pressurized gas from said upper pressurized gas space to said inner region of said rotor.

12. The system of claim 7, wherein said housing is mounted on a frame pivotal about an axis and is depended from said frame via a load cell remote from said axis.

13. The system of claim 12, further comprising flexible connecting elements( arranged at said charging inlet and said discharging outlet, respectively, with said axis extending through centers of said flexible connecting elements.

14. The system of claim 7, further comprising a suction means connected to said top wall at a position essentially after said discharging outlet in the rotation direction of said rotor for removing gas from said pockets.

15. The system of claim 8, further comprising at least one suction duct connected to an upper wall portion of said container means above at least one at said first region, said second region and/or said syphon means.

16. The system of claim 7, further comprising a volumetric metering device arranged upstream of said container means for supplying of pourable material to said container means dependent on least one of a rotational speed of said rotor and/or a signal provided by a pourable material level determining means arranged in said container means.

17. The system of claim 7, further comprising a storage bin having finely distributed has supplied to a lower region thereof for supplying pourable material to said container means.

18. The system of claim 7, further comprising conveying-away means arranged in a closed system for conveying-away pourable material removed from said pockets through said discharging outlet.

* * * * *